United States Patent

Chown et al.

[11] Patent Number: 4,688,267
[45] Date of Patent: Aug. 18, 1987

[54] OPTICAL FIBRE RECEIVER

[76] Inventors: David P. M. Chown, 22 Counting House Lane, Great Dunmow, Essex; Malcolm Spencer, 3 Wychford Drive, Sawbridgeworth, Hertfordshire, both of United Kingdom

[21] Appl. No.: 824,023

[22] Filed: Jan. 30, 1986

[51] Int. Cl.[4] .............................................. H04B 9/00
[52] U.S. Cl. .............................. 455/619; 250/214 A; 330/277; 330/308; 330/311
[58] Field of Search ............... 455/606, 607, 617, 619; 330/59, 308, 300, 277, 311; 250/214 R, 214 A, 214 AG, 214 C, 214 DC, 214 L, 214 RC

[56] References Cited

U.S. PATENT DOCUMENTS

| 3,449,683 | 6/1969 | Gane | 330/277 |
| 3,541,234 | 11/1970 | Austin | 330/300 |
| 4,189,682 | 2/1980 | Sechi | 330/277 |
| 4,420,724 | 12/1983 | Owen | 330/308 |
| 4,496,908 | 1/1985 | Takano | 330/277 |
| 4,591,803 | 5/1986 | Saleh | 330/277 |
| 4,620,321 | 10/1986 | Chown | 330/59 |

Primary Examiner—Joseph A. Orsino, Jr.
Attorney, Agent, or Firm—Lee, Smith & Zickert

[57] ABSTRACT

An optical receiver, for use with optical fibre or for receiving a beam in free space, has its detector device, usually a PIN diode (D) connected in series with a resistor (R1) and to the base of a gallium arsenide field effect transistor (FET). Although the latter is satisfactory at most frequencies of operation, in certain load conditions, instability can occur at Gigahertz frequencies. To overcome this, the source-drain path of the FET is shunted by 50 ohm resistor (R2) in series with a capacitor (C) of about 5 nanofarads. In addition the FET is coupled to a bipolar transistor amplifier by a relatively long wire bond (L) which acts as an inductive impedance at the frequencies at which this instability occurs. These measures between them suppress this instability.

3 Claims, 2 Drawing Figures

OPTICAL FIBRE RECEIVER

FIELD OF THE INVENTION

This invention relates to an optical receiver, such as is used to terminate an optical fibre transmission line, or to respond to a light beam in free space.

RELATED ART

The accompanying FIG. 1 shows a known optical receiver, in which light from an optical fibre falls on the PN junction of a PIN diode D connected in series with a resistor R1, the junction of the diode and the resistor being connected to the gate of a gallium arsenide field effect transistor FET. The main component in this circuit is the device FET, used to achieve the best possible signal-to-noise ratio. Such devices were originally developed for use as microwave amplifiers, and so can operate at frequencies of several tens of gigahertz (GHz), even though typical optical receivers work with bandwidths of only tens or hundreds of megahertz (MHz).

The drain of the FET is connected to the emitter of a bipolar NPN transistor BT so that the two devices are connected in a manner analogous to the well-known cascode circuit.

Although such a circuit is sometimes satisfactory, it has a tendency to instability at microwave-type frequencies, which can be deleterious to receiver performance. Hence an object of the invention is to provide a circuit in which the above-indicated difficulties are minimized or even overcome.

SUMMARY OF THE INVENTION

According to the invention, there is provided an optical receiver, which includes an opto-electronic detection device on which the light beam to be received falls from an optical fibre or from free space, a resistive impedance in series with the detection device, a field-effect transistor (FET) to the gate of which is connected the junction between the detection device and the resistive impedance, a further resistive impedance in series with a capacitor connected across the source-drain path of the FET, and a connection from the FET to a further transistor such that the emitter-collector path of the further transistor is in series with the source-drain path of the FET, said further transistor acting as an amplifier, wherein the further resistive impedance has a value which is low compared with that of the first-mentioned resistive impedance, and wherein the capacitor has a low value such that its impedance at frequencies of the order of 1 GHz or above is low.

DESCRIPTION OF THE PREFERRED EMBODIMENT (FIG. 2)

It has been shown by analysis, and confirmed by experiment, that a typical gallium arsenide FET terminated with an ideal 50 ohm load between its drain and source is stable for all gate-source impedances. However, for some load conditions when using such FET's, instability can result, especially at frequencies above 1 GHz.

Figure 1:
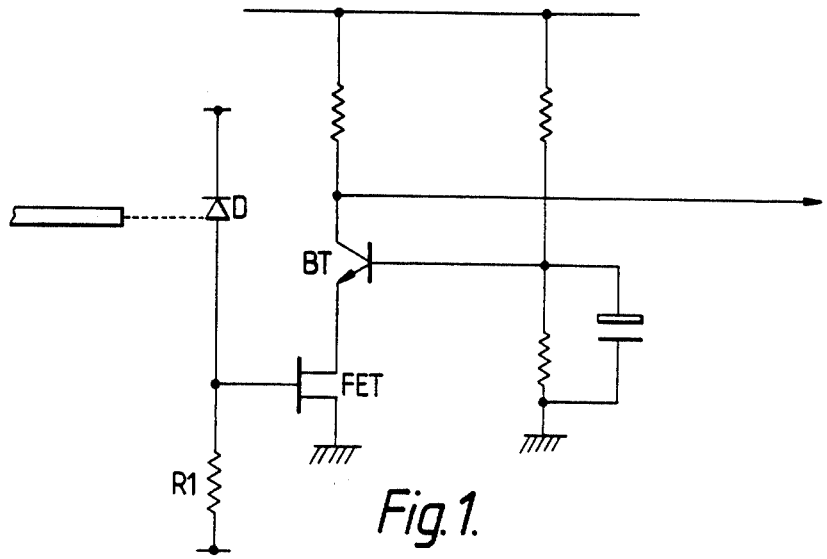
FIG. 1 depicts an optical receiver circuit according to the prior art which receiver circuit is well known.

In an optical receiver it is normal, as shown in FIG. 1 above, to terminate the FET into a bipolar common base stage, giving a "cascode-type" configuration which has good forward gain and low feedback capacitance. At lower frequencies, say within the signal bandwidth needed for the receiver, the common base stage appears as a resistive load of the order of 10 ohms. At frequencies of 1 GHz and above the effect of device speed limitations and parasitics results in a complex and variable drain-source load being presented by the common base stage to the FET, which frequently causes microwave instability. This unwanted stability is due to mismatch at frequencies beyond the required bandwidth.

Figure 2:
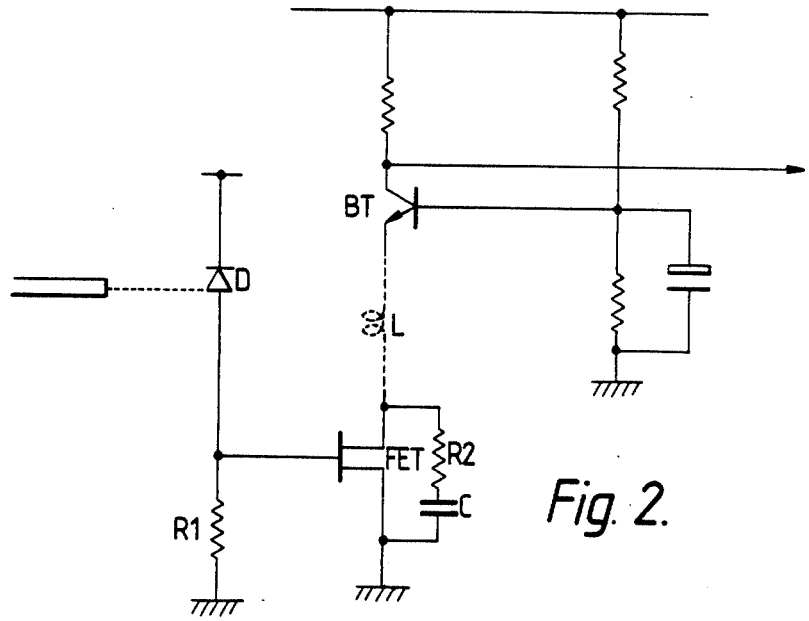
FIG. 2 depicts the preferred embodiment.

The circuit according to the invention, FIG. 2, overcomes the above indicated difficulties by the provision of a matched 50 ohm termination for the gallium arsenide, FET at frequencies above about 1 GHz. The circuit of FIG. 2 is similar in many respects to that of FIG. 1, so only the novel features thereof will be discussed. As shown, a 50 ohm resistor is connected in series with a miniature capacitor C of about 5 pF between the source and the drain of the FET, using physical connections as short as possible. This suitably adjusts the impedance of the device FET; note that the best values for these components will vary with different types of gallium arsenide FET, and indeed with different varieties of FET. Hence some measure of simple-experiment may be needed.

The connection from the FET to the base of the common base stage bipolar transistor BT is made using a relatively long (e.g. several mm) wire bond L, which presents a relatively high impedance due to its self-inductance at frequencies above about 1 GHz.

As a result the impedance presented by the bipolar stage to the FET is substantially isolated at microwave frequencies, leaving the desired 50 ohm (in the particular case) termination provided by the resistor (R2) and the capacitor C.

We claim:

1. In an optical receiver of the type employing a PIN diode which diode receives a light beam to provide a current through the diode proportional to the light intensity received with said diode in series with a resistive impedance with the junction between the diode and said resistive impedance connected to the gate electrode of a field effect transistor (FET), with the drain electrode of said FET coupled to the emitter electrode of a NPN bipolar transistor and with the source electrode coupled to a point of reference potential, with the collector electrode of said NPN transistor coupled to a point of operating potential and with the base electrode coupled to said point of reference potential via a biasing impedance network, the improvement in combination therewith of apparatus for preventing instability at frequencies of the order of 1 GHz or greater comprising:

a series resistor-capacitor network connected across the drain and source electrodes of said FET with said resistor having a value which is low compared to said resistive impedance in series with said diode and wherein said capacitor has a low impedance value at frequencies of the order of 1 GHZ or higher, with said drain electrode coupled to said emitter electrode via a relatively long bond wire which serves as an inductive impedance having a high impedance compared to said capacitor impedance at frequencies of the order of 1 GHz or greater.

2. The optical receiver combination according to claim 1 wherein said resistor in series with said capacitor is about 50 ohms, with said capacitor being about 5 picofarads.

3. The optical receiver combination according to claim 1 wherein said FET is a gallium arsenide device.

* * * * *